US007371010B2

United States Patent

(12) United States Patent
Uenosono et al.

(10) Patent No.: US 7,371,010 B2
(45) Date of Patent: May 13, 2008

(54) HYDRODYNAMIC BEARING DEVICE AND COMPACT MOTOR INCLUDING HYDRODYNAMIC BEARING DEVICE

(75) Inventors: Kaoru Uenosono, Ozu (JP); Yosei Yoshikawa, Toon (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 254 days.

(21) Appl. No.: 11/305,163

(22) Filed: Dec. 19, 2005

(65) Prior Publication Data

US 2006/0140521 A1 Jun. 29, 2006

(30) Foreign Application Priority Data

Dec. 28, 2004 (JP) ............................ 2004-378371

(51) Int. Cl.
*F16C 32/06* (2006.01)

(52) U.S. Cl. ...................................... 384/100; 384/107

(58) Field of Classification Search ................ 384/100, 384/107, 112, 114, 115; 310/90; 360/99.08, 360/98.07

See application file for complete search history.

(56) References Cited

U.S. PATENT DOCUMENTS 5,973,878 A * 10/1999 Yoshida et al. ............. 384/112
7,101,084 B2 * 9/2006 Gomyo ....................... 384/107
2003/0011929 A1 * 1/2003 Nii et al. ................. 360/99.08

FOREIGN PATENT DOCUMENTS

| | | |
|---|---|---|
| JP | 2000-125506 | 4/2000 |
| JP | 3786355 | 3/2006 |

* cited by examiner

*Primary Examiner*—Thomas R. Hannon
(74) *Attorney, Agent, or Firm*—Steptoe & Johnson LLP

(57) ABSTRACT

A shaft is rotatably inserted through a bearing hole of a sleeve, a screw hole for fastening a clamp to the shaft is formed along a direction of an axis from an upper end portion of the shaft, an operating fluid is charged in a gap between an inner peripheral surface of the sleeve and an outer peripheral surface of the shaft, and radial bearing parts constituted of dynamic pressure generating grooves are provided on the inner peripheral surface of the sleeve. As for an inside diameter of the sleeve, an inside diameter in a predetermined range from the opening upper end part is formed to be larger by an expected deformation amount in a diameter direction of the shaft than an inside diameter in a range at a lower end side from the predetermined range. The predetermined range corresponds to a range including a radial bearing part located at the upper end side.

14 Claims, 12 Drawing Sheets

7 3a 12 5b 17 13 L 4c 26 A 10b 4a 10a 16 10 4d B 27 5a 3 21 5 D4 ΔD/2 D2 D1

HYDRODYNAMIC BEARING DEVICE AND COMPACT MOTOR INCLUDING HYDRODYNAMIC BEARING DEVICE

FIELD OF THE INVENTION

The present invention relates to a hydrodynamic bearing device which is used for a thin small motor of, for example, not more than 2.5 inches such as an HDD motor, and a compact and low-profile motor including a hydrodynamic bearing device.

BACKGROUND OF THE INVENTION

In recent years, with entry of HDDs into AV products and home electrical products, spindle motors are required to be compact, thin, highly accurate and have long life spans. FIG. 10 shows a construction of the spindle motor. A base 51 is provided with a sleeve 52 having a bearing hole. A shaft 53 is inserted through the bearing hole. A hub 54 which receives a disk 65 and a clamp 55 for holding the disc 65 on the hub 54 are provided at an upper end portion of the shaft 53. The clamp 55 is fastened to the shaft 53 by screwing a clamp screw 56 into a screw hole 57 (female screw) formed in the shaft 53.

The shaft 53 is constructed by a body shaft part 53*a*, a tip end shaft part 53*b* formed at an upper end of the body shaft part 53*a* and a thrust flange part 53*c* formed at a lower end of the body shaft part 53*a*. A diameter of the tip end shaft part 53*b* is smaller than a diameter of the body shaft part 53*a*. The tip end shaft part 53*b* is fitted into the hub 54.

A diameter of the thrust flange part 53*c* is larger than the diameter of the body shaft part 53*a*. The hub 54 is provided with a magnet 66. A stator 67 with a coil wound around is provided at the base 51 to be opposed to an inner peripheral side of the magnet 66.

In order to increase accuracy and a life of the spindle motor, a hydrodynamic bearing with the following structure is adopted for the bearing.

Namely, a thrust plate 58 which receives a thrust load which acts on the shaft 53 is provided at a lower end portion of the sleeve 52.

A gap 60*a* is formed between an outer peripheral surface of the body bearing part 53*a* of the shaft 53 and an inner peripheral surface of the sleeve 52. A gap 60*b* is formed between an outer peripheral surface of the thrust flange part 53*c* and an inner peripheral surface of the sleeve 52. A gap 60*c* is formed between a top surface of the thrust flange part 53*c* and a lower surface of the sleeve 52 which is opposed to the top surface of the thrust flange part 53*c*. A gap 60*d* is formed between a lower surface of the thrust flange part 53*c* and a top surface of the thrust plate 58. Operating oil 61 which is an operating fluid is filled in each of the gaps 60*a* to 60*d*.

A pair of radial bearing parts 62*a* and 62*b* are provided in a direction of an axis 68 (vertical direction) at the inner peripheral surface of the sleeve 52. A dynamic pressure generating groove is formed in each of the radial bearing parts 62*a* and 62*b*.

A main thrust bearing part 63 is provided on a top surface of the thrust plate 58. A dynamic pressure generating groove is formed in the main thrust bearing part 63.

An auxiliary thrust bearing part 64 is provided on a top surface of the thrust flange part 53*c*. A dynamic pressure generating groove is formed in the auxiliary thrust bearing part 64.

The dynamic pressure generating groove of the main thrust bearing part 63 provided at the top surface of the thrust plate 58 may be provided on an undersurface of the thrust flange part 53*c*.

In such a construction, when a coil is energized, a rotary magnetic field occurs to the stator 67, with which the hub 54 to which the magnet 66 is mounted rotates, and the disk 65 held on the hub 54 rotates. On this occasion, the shaft 53 fixed to the hub 54 rotates, dynamic pressure is generated by each of the bearing parts 62*a*, 62*b*, 63 and 64, a radial load is supported by the radial bearing parts 62*a* and 62*b*, and a thrust load is supported by the main thrust bearing part 63 and the auxiliary thrust bearing part 64.

However, in the above described conventional type, an outside diameter of the shaft 53 becomes small with miniaturization of the spindle motor, and a wall thickness t in a diameter direction between the outer peripheral surface of the body bearing part 53*a* of the shaft 53 and the screw hole 57 becomes small. Therefore, when the clamp screw 56 is screwed into the screw hole 57 and fastened thereto, as shown by the solid line in FIG. 11, the upper portion of the shaft 53 bulges outward (outside diameter direction) and deforms, and an upper portion of the gap 60*a* is reduced in the diameter direction and narrower than a lower portion. As a result, the adverse effects that the generated dynamic pressure of the radial bearing part 62*a* becomes large, the pressure in the vicinity of the gap 60*d* rises via the gaps 60*a*, 60*b* and 60*c*, and the shaft 53 excessively floats (excessive floatation).

FIGS. 10 and 11 show the spindle motor adopting the hydrodynamic bearing, and Japanese Patent Laid-Open No. 2000-125506 discloses a spindle motor that adopts a pair of upper and lower ball bearings 71 and 72 instead of a hydrodynamic bearing as shown in FIG. 12. According to this, a screw hole 75 for fixing a clamp 74 at an upper end portion of a shaft 73 is formed. When a wall thickness in the diameter direction between the outer peripheral surface of the shaft 73 and the screw hole 75 is set as t, and a root diameter of the screw hole 75 is set as D0, the dimension is set so as to satisfy the following expression.

$$t \geqq D0/2 \qquad \text{expression (1)}$$

By satisfying the expression (1), an inner ring of the upper ball bearing 71 can be prevented from being deformed by the stress at the time of fastening a screw 76 into the screw hole 75.

However, in the spindle motor shown in FIG. 12, there is the problem that an outside diameter of the shaft 73 becomes large (increases) when the expression (1) is to be satisfied, which becomes a hindrance to miniaturization of the spindle motor.

The present invention has an object to provide a hydrodynamic bearing device capable of preventing an adverse effect by deformation of a shaft when a screw is fastened to a screw hole and promoted in miniaturization, and a compact motor including the hydrodynamic bearing device.

DISCLOSURE OF THE INVENTION

A hydrodynamic bearing device of the present invention is a hydrodynamic bearing device including a sleeve having a bearing hole formed therein, and a shaft inserted in the bearing hole, one of the sleeve and the shaft being fixed and the other being made to be rotatable, wherein the shaft has a screw hole for fastening another members to the shaft, the screw hole being formed to extend from one end portion of the shaft along a direction of an axis thereof to the other end side past an opening one end portion of the sleeve, an operating fluid is charged in a gap between an inner peripheral surface of the sleeve and an outer peripheral surface of the shaft, radial bearing parts having dynamic pressure generating grooves formed therein are provided on at least one of the inner peripheral surface of the sleeve and the outer peripheral surface of the shaft, and an inside diameter of the sleeve in a predetermined range including at least an area ranging from the opening one end part of the sleeve to a tip end portion of a screw that is screwed into the screw hole is formed to be larger by an expected deformation amount in a diameter direction of the shaft than an inside diameter of the sleeve in a range on the other end side from the predetermined range.

According to such a construction, on fastening the other members to the shaft, one end portion of the shaft bulges outward in the diameter direction (outside direction) and deforms. For this, the inside diameter of the sleeve is formed to be larger by the expected deformation amount with the deformation of the shaft included in the predetermined range at least from the opening one end portion of the sleeve. Therefore, even if the shaft deforms, the gap between the inner peripheral surface of the sleeve and the outer peripheral surface of the shaft in the predetermined range can be prevented from being narrowed in the diameter direction, and the gap between the inner peripheral surface of the sleeve and the outer peripheral surface of the shaft can be kept in a suitable size. As a result, an adverse effect by the deformation of the shaft can be prevented. Since the wall thickness in the diameter direction from the outer surface of the shaft to the screw hole can be made thin, the outside diameter of the shaft can be made small, and miniaturization is promoted.

The hydrodynamic bearing device of the present invention is characterized in that a plurality of radial bearing parts are provided in a direction of the axis of the shaft, the tip end portion of the screw which is screwed into the screw hole enters a formation range of the radial bearing part located at one end side, and the predetermined range corresponds to a range including an area from the opening one end part of the sleeve to the radial bearing part located at the one end side.

The hydrodynamic bearing device of the present invention is characterized in that the bearing hole of the sleeve is formed to be straight in the predetermined range.

The hydrodynamic bearing device of the present invention is characterized in that the bearing hole of the sleeve is formed to have cylindricity of not more than 0.5 μm in the predetermined range.

The hydrodynamic bearing device of the present invention is characterized in that the bearing hole of the sleeve is formed in a taper shape so as to become larger in diameter toward opening one end part in the predetermined range.

The hydrodynamic bearing device of the present invention is characterized in that the shaft is rotatable with respect to the sleeve fixed to a base, a thrust plate opposed to the other end surface of the shaft is provided at the other end portion of the sleeve, the gap between the inner peripheral surface of the sleeve and the outer peripheral surface of the shaft and a gap between the other end surface of the shaft and the thrust plate communicate with each other, the operating fluid is charged in these gaps, and a thrust bearing part having a dynamic pressure generating groove formed therein is provided on at least one of the other end surface of the shaft and the thrust plate.

According to such a construction, when the shaft rotates, the thrust load is supported at the thrust bearing part. By fastening the screw into the screw hole of the shaft, the gap between the inner peripheral surface of the sleeve and the outer peripheral surface of the shaft in the predetermined range can be prevented from being reduced in the diameter direction and narrowed even if the one end portion of the shaft bulges outward in the diameter direction and deforms. As a result, the gap between the inner peripheral surface of the sleeve and the outer peripheral surface of the shaft can be kept in a suitable size. Accordingly, the generated dynamic pressure of the radial bearing part does not become large, and the pressure in the vicinity of the gap between the other end surface of the shaft and the thrust plate does not rise via the gap between the inner peripheral surface of the sleeve and the outer peripheral surface of the shaft. As a result, the adverse effect of the shaft excessively floating (excessive float) can be prevented.

A compact motor of the present invention includes the above described hydrodynamic bearing device.

According to such a construction, miniaturization of the motor can be promoted.

Another hydrodynamic bearing device of the present invention is a hydrodynamic bearing device including a sleeve having a bearing hole formed therein, and a shaft inserted in the bearing hole, one of the sleeve and the shaft being fixed and the other being made to be rotatable, the shaft has a screw hole for fastening another members to the shaft, the screw hole being formed to extend from one end portion of the shaft along a direction of an axis thereof to the other end side past an opening one end part of the sleeve, an operating fluid is charged in a gap between an inner peripheral surface of the sleeve and an outer peripheral surface of the shaft, radial bearing parts having dynamic pressure generating grooves formed therein are provided on at least any one of the inner peripheral surface of the sleeve and the outer peripheral surface of the shaft, and an outside diameter of the shaft in a predetermined range including at least an area from a portion facing the opening one end part of the sleeve to a tip end portion of a screw which is screwed into the screw hole is formed to be smaller by an expected deformation amount in a diameter direction of the shaft than an outside diameter of the shaft in a range at the other end side from the predetermined range.

According to such a construction, by fastening the screw into the screw hole of the shaft, one end portion of the shaft bulges outward in the diameter direction and deforms. For this, the outside diameter of the shaft is formed to be smaller by the expected deformation amount with the deformation of the shaft included in the predetermined range at least from the portion facing opening one end portion of the sleeve. Therefore, even if the shaft deforms, the gap between the inner peripheral surface of the sleeve and the outer peripheral surface of the shaft in the predetermined range can be prevented from being reduced in the diameter direction and narrowed, and the gap between the inner peripheral surface of the sleeve and the outer peripheral surface of the shaft can be kept in a suitable size. As a result, an adverse effect by the deformation of the shaft can be prevented. Since the wall thickness in the diameter direction from the outer surface of the shaft to the screw hole can be made thin, the outside diameter of the shaft can be made small, and miniaturization is promoted.

The hydrodynamic bearing device of the present invention is characterized in that the predetermined range corresponds to a range of the length from a portion facing the opening one end part of the sleeve to the tip end portion of the screw which is screwed into the screw hole with addition of a wall thickness in the diameter direction of the shaft of the portion formed with the screw hole.

The hydrodynamic bearing device of the present invention is characterized in that the shaft is formed to be straight in the predetermined range.

The hydrodynamic bearing device of the present invention is characterized in that the shaft is formed to have cylindricity of not more than 0.5 μm in the predetermined range.

The hydrodynamic bearing device of the present invention is characterized in that the shaft is formed in a taper shape which becomes smaller in diameter toward the one end side in the predetermined range.

The hydrodynamic bearing device of the present invention is characterized in that, the shaft is rotatable with respect to the sleeve fixed to a base, a thrust plate opposed to the other end surface of the shaft is provided at the other end portion of the sleeve, the gap between the inner peripheral surface of the sleeve and the outer peripheral surface of the shaft and a gap between the other end surface of the shaft and the thrust plate communicate with each other, the operating fluid is charged in these gaps, and a thrust bearing part having a dynamic pressure generating groove formed therein is provided on at least one of the other end surface of the shaft and the thrust plate.

According to such a construction, when the shaft rotates, the thrust load is supported by the thrust bearing part. By fastening the screw into the screw hole of the shaft, the gap between the inner peripheral surface of the sleeve and the outer peripheral surface of the shaft in the predetermined range can be prevented from being reduced in the diameter direction and narrowed even if the one end portion of the shaft bulges outward in the diameter direction and deforms. As a result, it becomes possible to keep the gap between the inner peripheral surface of the sleeve and the outer peripheral surface of the shaft in a suitable size. Accordingly, the generated dynamic pressure of the radial bearing part does not become large, and the pressure in the vicinity of the gap between the other end surface of the shaft and the thrust plate does not rise via the gap between the inner peripheral surface of the sleeve and the outer peripheral surface of the shaft. As a result, the adverse effect of the shaft excessively floating (excessive float) can be prevented.

Another compact motor of the present invention includes the above described hydrodynamic bearing device.

According to such a construction, miniaturization of the motor can be promoted.

DESCRIPTION OF THE EMBODIMENTS

In order to describe the present invention in more detail, the present invention will be described with reference to the attached drawings.

A first embodiment of the present invention will be described first based on FIGS. 1 to 5.

Figure 1:
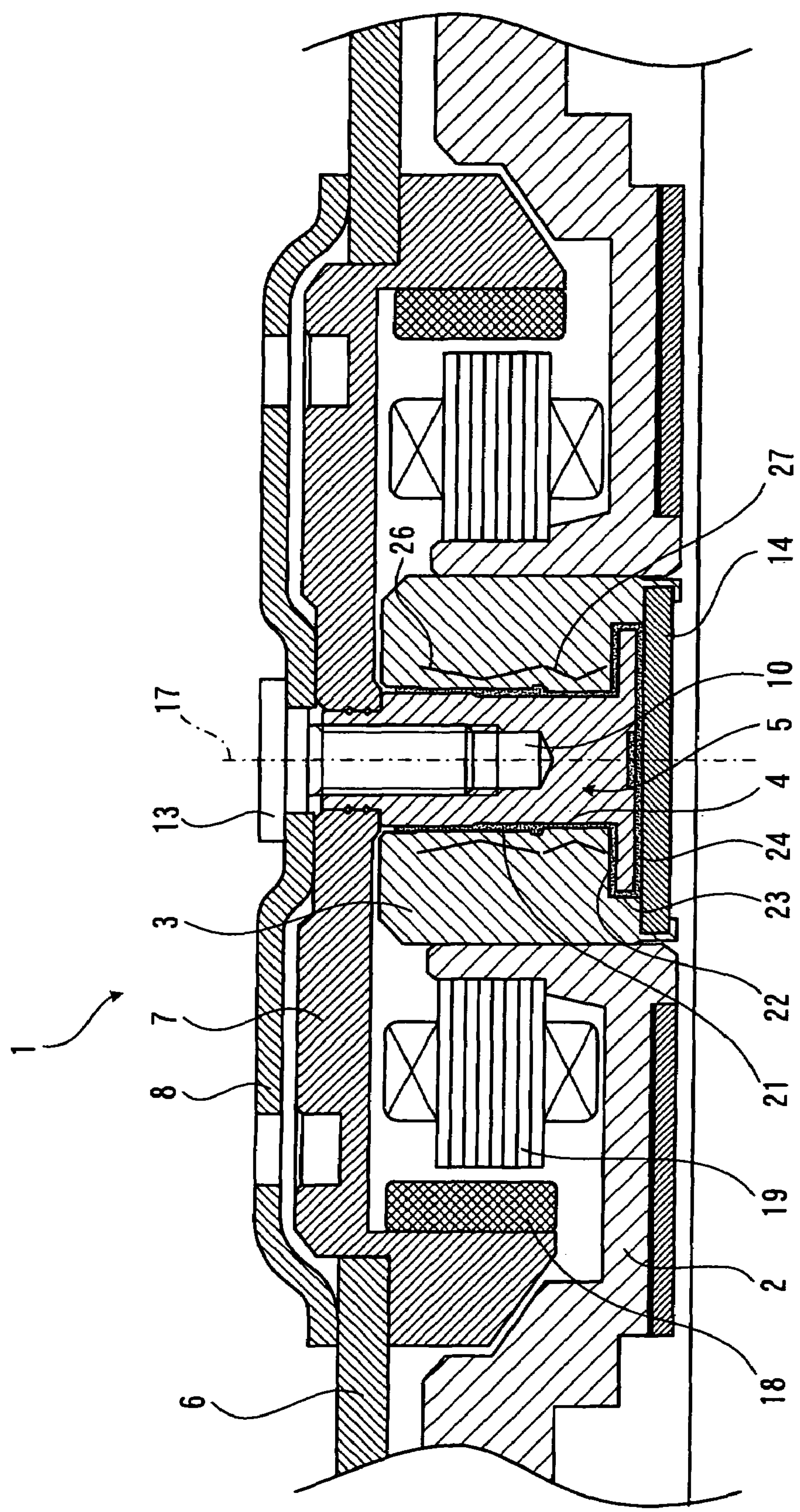
FIG. 1 is a sectional view of a motor according to a first embodiment.

FIG. 1 is a sectional view of a shaft-rotation type small thin motor 1, and a base 2 is provided with a cylindrical sleeve 3. A bearing hole 4 is formed in this sleeve 3, and a shaft 5 is rotatably inserted through the bearing hole 4. A hub 7 (one example of another member) which bears a disk 6 and a clamp 8 (one example of another member) for holding the disk 6 on the hub 7 are provided at an upper end portion (one end portion) of the shaft 5. A magnet 18 is provided at the hub 7. A stator 19 which is opposed to the magnet 18 from an inner side in the diameter direction is provided at the base 2.

Figure 3:
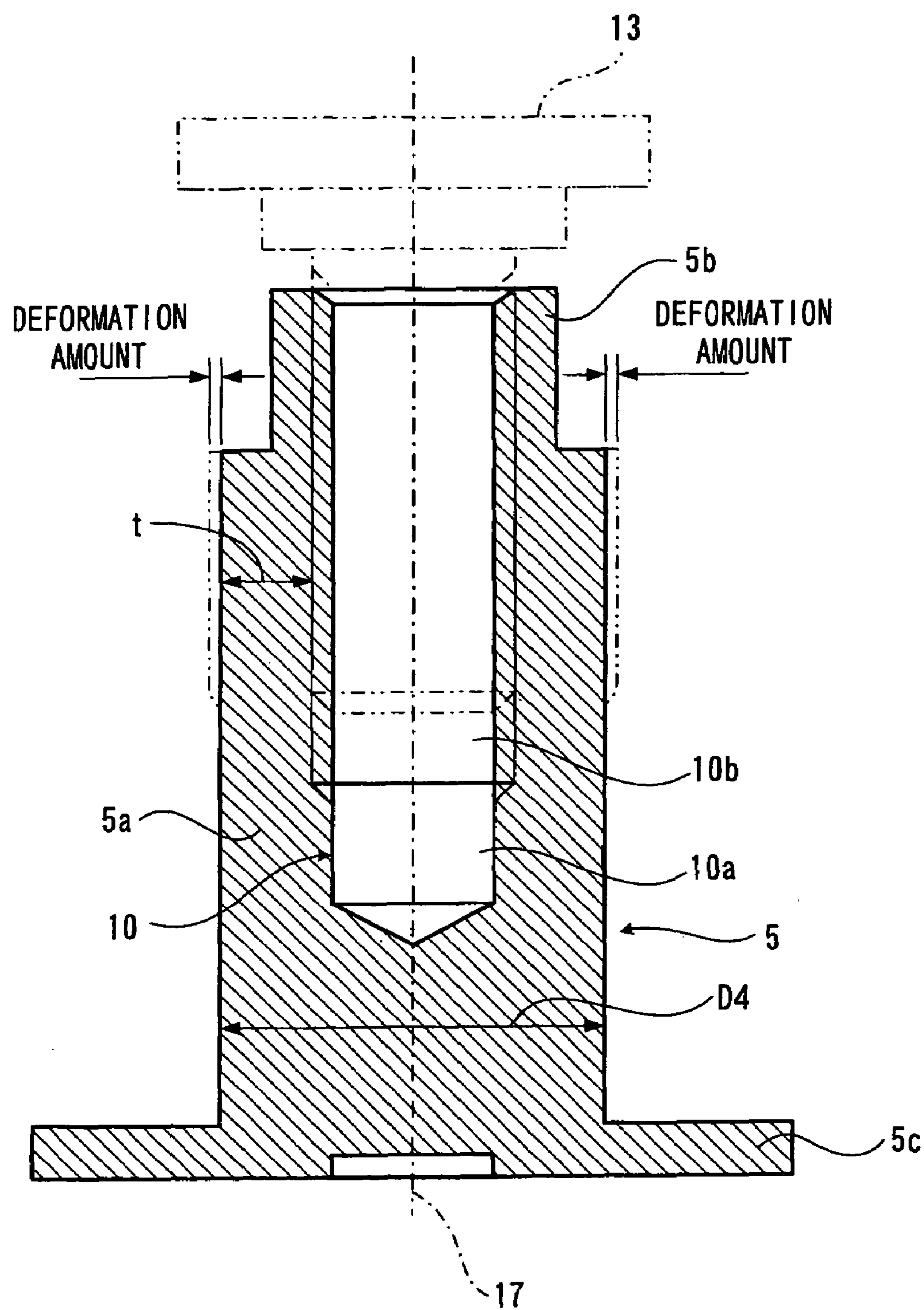
FIG. 3 is a sectional view of a shaft of the motor, showing by solid lines a state in which a clamp screw is not screwed into the shaft and showing by phantom lines a state in which the clamp screw is screwed into the shaft and the shaft deforms.

As shown in FIG. 3, the shaft 5 is constructed by a body shaft part **5*a* inserted into the bearing hole 4, a tip end shaft part 5*b* which is formed at an upper end portion of the body shaft part 5*a*, and a thrust flange part 5*c* which is formed at a lower end portion of the body shaft part 5*a*. In this case, the thrust flange part 5*c* is worked integrally with the body shaft part 5*a***, but they may be individually produced, and fixed by welding, screwing and plastic working such as caulking.

An outside diameter of the tip end shaft part **5*b* is set to be smaller than an outside diameter D4 of the body shaft part 5*a*, and an outside diameter of the thrust flange part 5*c* is set to be larger than the outside diameter D4 of the body shaft part 5*a*. An upper end of the body shaft part 5*a* faces an opening upper end part 3*a* (opening one end portion) of the sleeve 3**.

A screw hole 10 which is open to an upper end surface is formed in the shaft 5. The screw hole 10 is constructed by a lower hole part **10*a*, and a female screw part 10*b* formed on an inner periphery of the lower hole part 10*a*. The screw hole 10 is formed from the upper end surface of the shaft 5 along a direction of an axis 17 past the opening upper end part 3*a*** to a lower end side (the other end side).

The tip end shaft part **5*b* of the shaft 5 is fitted into a through hole 12 formed at a central portion of the hub 7. By screwing the clamp screw 13 into the above described screw hole 10, the hub 7 and the clamp 8 are fastened to the upper end portion of the shaft 5**.

A thrust plate 14 which is opposed to a lower part of the thrust flange part **5*c* is provided at a lower end portion (the other end portion) of the sleeve 3. The lower end portion of the sleeve 3 is closed by the thrust plate 14**.

Figure 4:
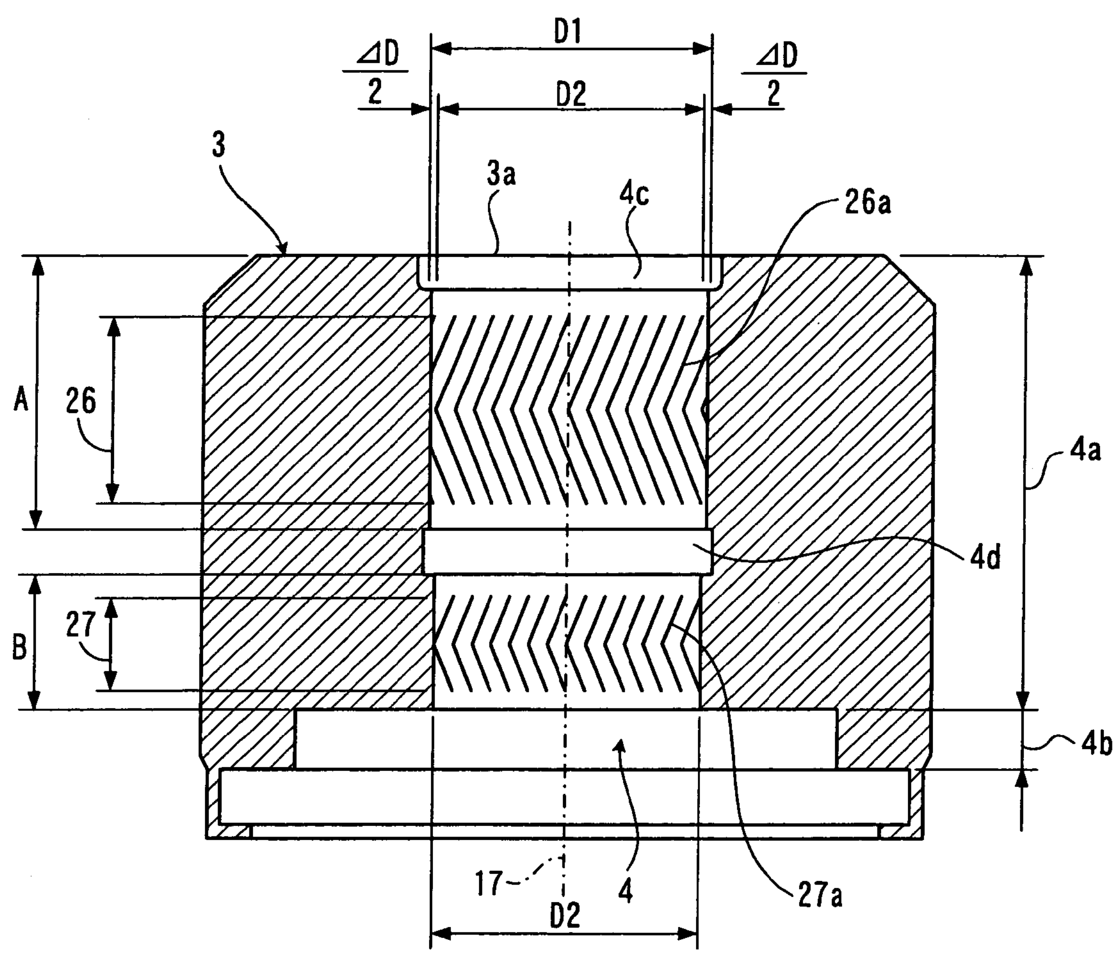
FIG. 4 is a sectional view of a sleeve of the motor.
Figure 5:
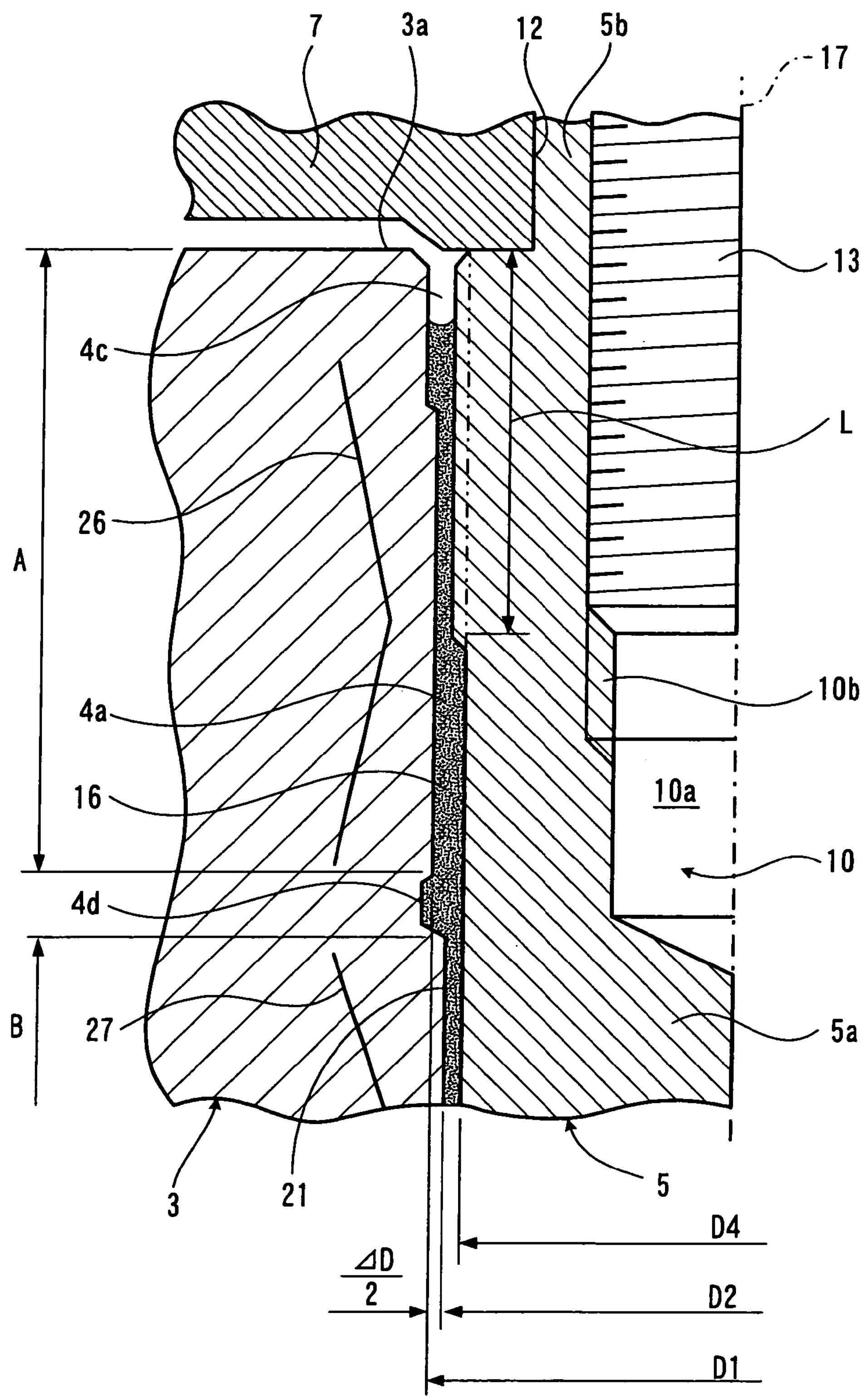
FIG. 5 is an enlarged sectional view of an upper part of a gap between an inner peripheral surface of the sleeve and an outer peripheral surface of the shaft of the motor.

As shown in FIG. 4, the bearing hole 4 of the sleeve 3 is constructed by a body shaft insertion hole part **4*a* and a flange insertion hole part 4***b*. The body shaft part 5*a* of the shaft 5 is inserted through the body shaft insertion hole part 4*a*, and the thrust flange part 5*c* is inserted through the flange insertion hole part 4*b*.

A seal surface part 4*c* is formed at an upper end portion (one end portion) of the body shaft insertion hole part 4*a*. A diameter of the seal surface part 4*c* is slightly larger than a diameter of the body shaft insertion hole part 4*a*. An oil reservoir part 4*d* is formed between both upper and lower end portions of the body shaft insertion hole part 4*a*. The diameter of the oil reservoir part 4*d* is slightly larger than the diameter of the body shaft insertion hole part 4*a*.

Figure 2:
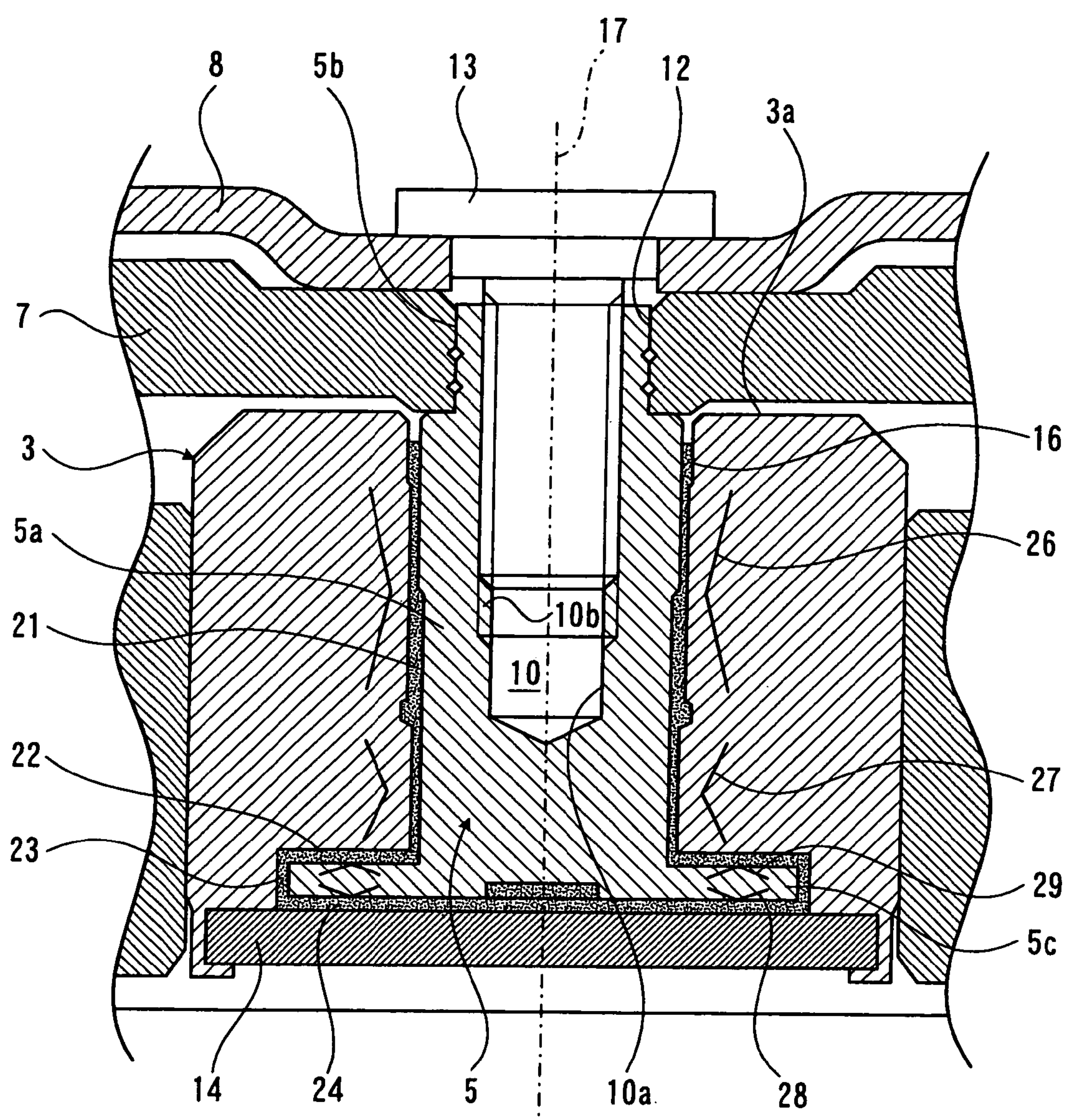
FIG. 2 is an enlarged sectional view of a hydrodynamic bearing device of the motor.

As shown in FIG. 2, a first gap 21 is formed between an outer peripheral surface of the body shaft part 5*a* of the shaft 5 and an inner peripheral surface of the body shaft insertion hole part 4*a* of the sleeve 3. A second gap 22 is formed between an upper surface (one end surface) of the thrust flange part 5*c* and a lower portion surface of the sleeve 3 which is opposed to this upper surface. A third gap 23 is formed between an outer peripheral surface of the thrust flange part 5*c* and an inner peripheral surface of a flange insertion hole part 4*b* of the sleeve 3. A fourth gap 24 is formed between the thrust flange part 5*c* and the thrust plate 14. These first to fourth gaps 21 to 24 communicate with each other, and these gaps 21 to 24 are filled with an operating oil 16 (one example of an operating fluid).

As shown in FIG. 4, radial bearing parts 26 and 27 are provided on the inner peripheral surface of the sleeve 3. A pair of these radial bearing parts 26 and 27 are provided in a vertical direction (namely, in the direction of the axis 17 of the shaft 5). These radial bearing parts 26 and 27 respectively generate radial load support pressure by an action of radial dynamic pressure generating grooves 26*a* and 27*a* in a herring-bone shape or the like which are formed on the inner peripheral surface of the sleeve 3. The tip end part of the clamp screw 13 enters a formation range of the radial bearing part 26 at the upper end side. The oil reservoir part 4*d* is placed between the both the upper and lower radial bearing parts 26 and 27.

As shown in FIG. 2, a main thrust bearing part 28 is provided on a lower end surface (the other end surface of the shaft 5) of the thrust flange part 5*c* of the shaft 5. The main thrust bearing part 28 generates thrust load support pressure by an action of a main thrust dynamic pressure generating groove (not shown) in a herring-bone shape (a spiral shape or the like) which is formed on the lower end surface of the thrust flange part 5*c*.

Further, an auxiliary thrust bearing part 29 is provided on an upper end surface of the thrust flange part 5*c*. The auxiliary thrust bearing part 29 generates thrust load support pressure by an action of an auxiliary thrust dynamic pressure generating groove (not shown) in a herring-bone shape (a spiral shape or the like) which is formed on the upper end surface of the thrust flange part 5*c*.

As shown in FIG. 4, diameters D1 and D2 of the body shaft insertion hole part 4*a* of the bearing hole 4 (namely, inner diameters of the sleeve 3) have the following relationship. The diameter D1 of the body shaft insertion hole part 4*a* in a predetermined range A from the opening upper end part 3*a* of the sleeve 3 is formed to be larger by an expected deformation amount ΔD in a diameter direction of the shaft 5 as compared with the diameter D2 of the body shaft insertion part 4*a* in a range B at a lower end side (the other end side) from the predetermined range A (namely, D1=D2+ΔD). The diameter D2 of the body shaft insertion hole part 4*a* has the value corresponding to an outer diameter D4 of the main shaft part 5*a* of the shaft 5.

The predetermined range A corresponds to a range from the opening upper end part 3*a* of the sleeve 3 to the radial bearing part 26 at the upper end side, and includes an area from the opening upper end part 3*a* of the sleeve 3 to a tip end portion of the clamp screw 13. The range B at the lower end side from the predetermined range A corresponds to a range from the lower end of the body shaft insertion hole part 4*a* to the radial bearing part 27 at the lower end side.

The diameter D1 of the body shaft insertion hole part 4*a* of the bearing hole 4 is constant and does not change in the predetermined range A. Thereby, the body shaft insertion hole part 4*a* is formed to be a straight (upright) hole. As an example, the body shaft insertion hole part 4*a* of the bearing hole 4 is formed in the predetermined range A with cylindricity of less than 0.5 μm.

An operation in the above described construction will be described hereinafter.

The tip end shaft part 5*b* of the shaft 5 is fitted into the through-hole 12 of the hub 7, the clamp screw 13 is fastened to the screw hole 10, and the hub 7 and the clamp 8 are fastened to the shaft 5. Since on this occasion, the shaft 5 is to bulge outward in the diameter direction (in the outside diameter direction) in the range of the screwing depth of the clamp screw 13, the body shaft part 5*a* bulges outward in the diameter direction in a range L from the upper end to the tip end of the clamp screw 13 as shown by the solid line in FIG. 5, and the outside diameter extends to be larger than D4 (see the phantom line in FIG. 3).

On the other hand, as shown in FIG. 4, the diameter D1 of the bearing hole 4 of the sleeve 3 in the predetermined range A of the body shaft insertion hole part 4*a* is formed to be larger by the expected deformation amount ΔD in the diameter direction of the shaft 5 as compared with the diameter D2 in the range B. Therefore, even if the body shaft part 5*a* of the shaft 5 bulges outward in the diameter direction (the outside diameter direction) and deforms as described above, the first gap 21 in the predetermined range A can be prevented from being reduced in the diameter direction and narrowed. As a result, it is possible to keep the first gap 21 in a suitable size.

By energizing the stator 19, the shaft 5 rotates, and the disk 6, the hub 7 and the clamp 8 rotate integrally with the shaft 5. In this case, the radial load support pressure generates and the radial load is supported by the action of the radial dynamic pressure generating grooves 26*a* and 27*a* of both the radial bearing parts 26 and 27, and thrust load support pressure generates and the thrust load is supported by the action of the main thrust dynamic pressure generating groove of the main thrust bearing part 28 and the auxiliary thrust dynamic pressure generating groove of the auxiliary thrust bearing part 29.

When the shaft 5 rotates as described above, it is possible to keep the first gap 21 in a suitable size with respect to the deformation of the shaft 5 as described above, and therefore, generated dynamic pressure of the radial bearing parts 26 and 27 does not become large, and the pressure in the vicinity of the gap 24 does not rise via the gaps 21, 22 and 23. Thereby, the adverse effect that the shaft 5 excessively floats (excessive float) can be prevented.

Since the wall thickness t in the diameter direction between the outer peripheral surface of the body shaft part 5*a* of the shaft 5 and the screw hole 10 can be made thin, it is possible to make the outside diameter D4 of the body shaft part 5*a* small, and miniaturization of the motor 1 can be promoted.

Next, one example of the expected deformation amount AD in the diameter direction of the shaft 5 in the first embodiment will be described in (1) to 4. As for the expected deformation amount ΔD, for example, a change in an axial direction of the outside diameter at the time of the shaft 5 being a single body is obtained with a non-contact displacement gauge, then, a change in the axial direction of the outside diameter at the time of screwing the clamp screw 13 into the shaft 5 is similarly obtained, and from the difference between them, the expected deformation amount ΔD can be obtained.

(1) When the material of the shaft 5 is high Mn, Cr system stainless steel (for example, ASK 8000), the size of the clamp screw 13 is M1.6, and the outside diameter of the body shaft part 5*a* of the shaft 5 is ϕ2.4 mm, the expected deformation amount ΔD (offset amount) is about 1.2 μm. When the outside diameter is ϕ3.0 mm, the expected deformation amount ΔD (offset amount) is about 0.8 μm.

(2) When the material of the shaft 5 is high Mn, Cr system stainless steel, and the wall thickness in the diameter direction from the outer peripheral surface of the body shaft part 5*a* of the shaft 5 to the screw hole 10 is set as t, the expected deformation amount ΔD (offset amount) is in the range which satisfies the following expression.

$$\Delta D/2=-a\times t+b$$

where a=0.15 to 0.5, and b=0.7 to 1.10.

(3) When the material of the shaft 5 is martensitic stainless steel (for example, SUS420J2), the size of the clamp screw 13 is M1.6, and the outside diameter of the body shaft part 5*a* of the shaft 5 is ϕ2.4 mm, the expected deformation amount ΔD (offset amount) is about 1.0 μm. When the outside diameter is 3.0 mm, the expected deformation amount ΔD (offset amount) is about 0.3 μm.

4. When the material of the shaft 5 is martensitic stainless steel, and the wall thickness in the diameter direction between the outer peripheral surface of the body shaft part 5*a* of the shaft 5 and the screw hole 10 is set as t, the expected deformation amount ΔD (offset amount) is in the range which satisfies the following expression.

$$\Delta D/2=-c\times t+d$$

where c=0.35 to 0.7, and d=0.65 to 1.1.

Next, a second embodiment in the present invention will be described based on FIG. 6.

The body shaft insertion hole part 4*a* of the bearing hole 4 of the sleeve 3 is formed as a tapered hole which becomes larger in diameter toward the opening upper end part 3*a* in the predetermined range A. In this case, the diameter of the body shaft insertion hole part 4*a* is D1 at the upper end portion of the predetermined range A, and is D2 at the lower end portion of the predetermined range A.

Figure 6:
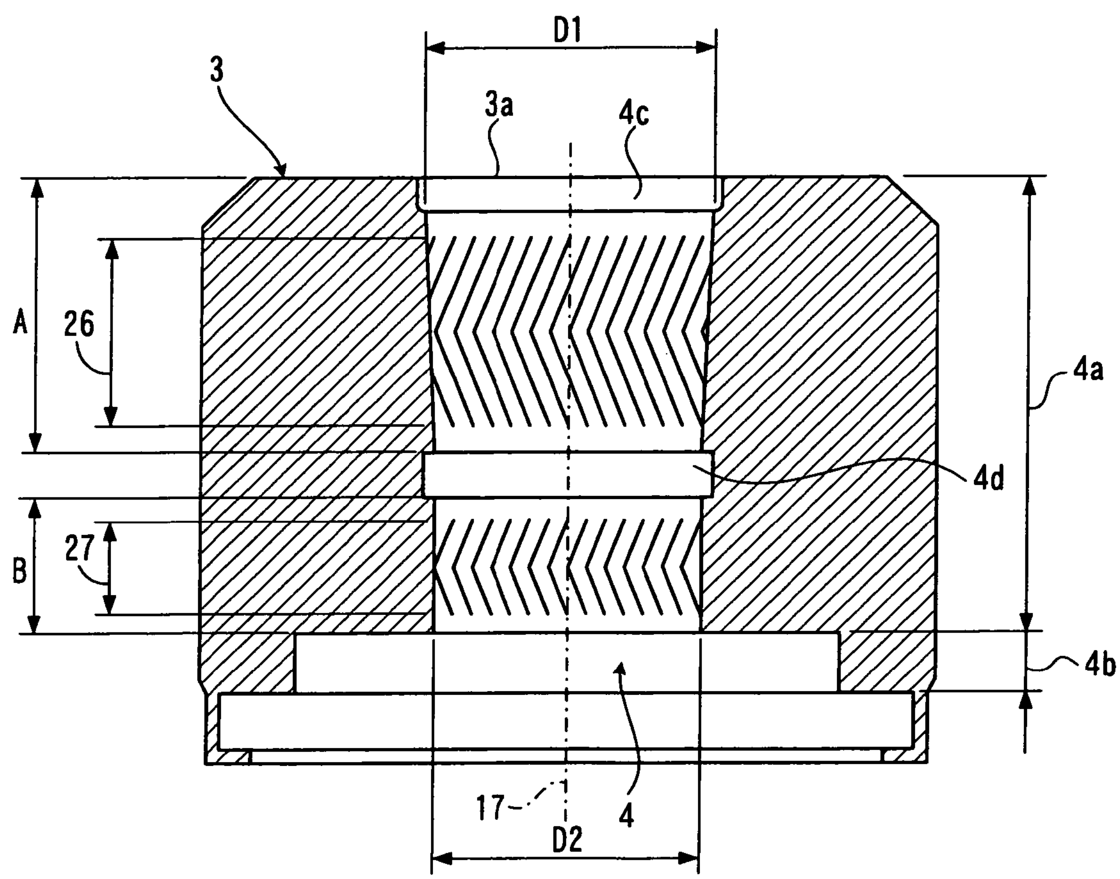
FIG. 6 is a sectional view of a sleeve of a motor according to a second embodiment.

As described in FIGS. 4 and 6, in the first and second embodiments, the range from the opening upper end part 3*a* of the sleeve 3 to the radial bearing part 26 at the upper end side is set as the predetermined range A, but the range from the opening upper end part 3*a* of the sleeve 3 to the tip end portion of the clamp screw 13 may be set as the predetermined range A. Alternatively, a range which is upper from the range from the opening upper end part 3*a* of the sleeve 3 to the tip end portion of the clamp screw 13 and is lower from the range including the radial bearing part 26 at the upper end side from the opening upper end part 3*a* of the sleeve 3 may be set as the predetermined range A.

Figure 7:
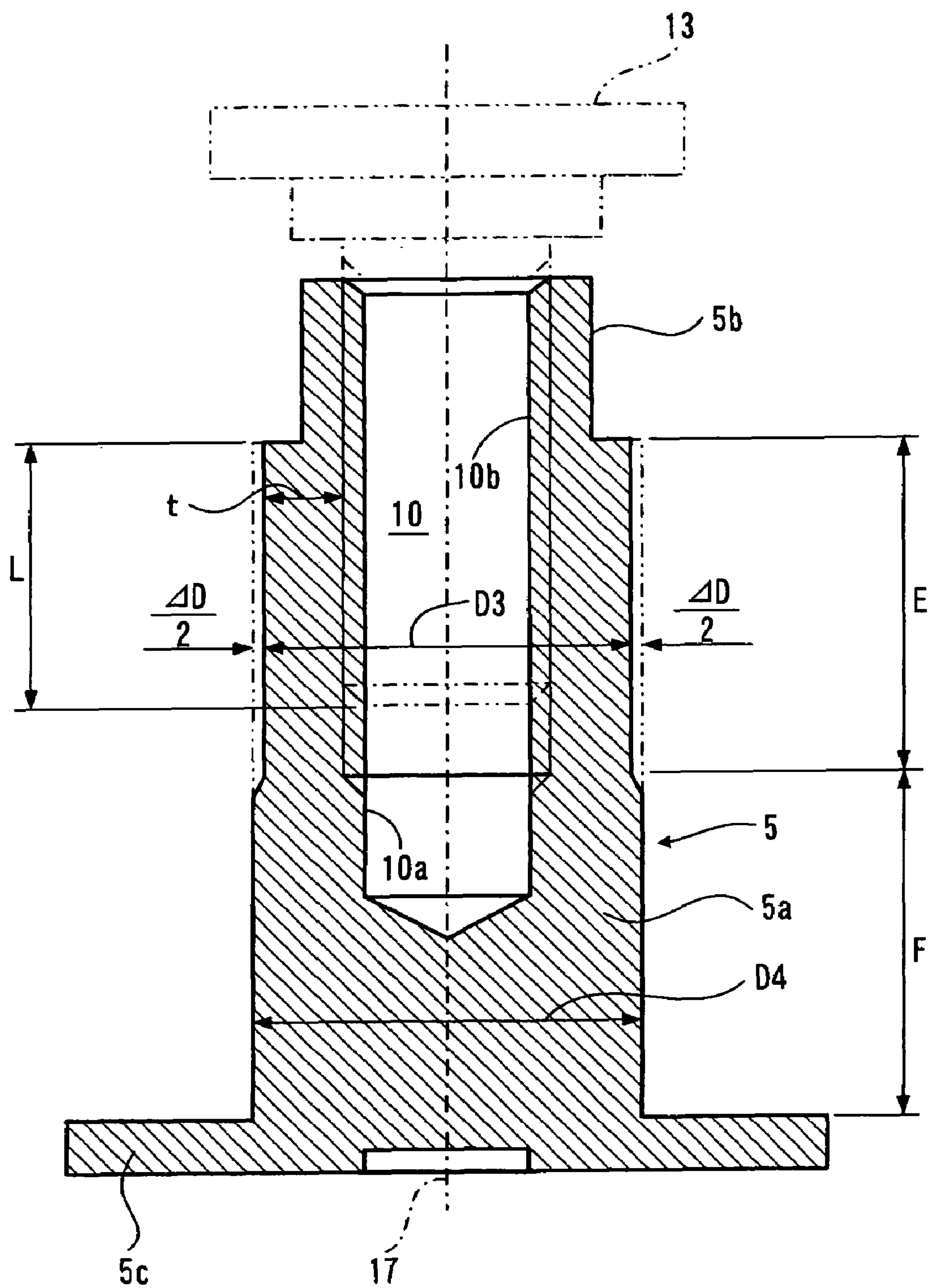
FIG. 7 is a sectional view of a shaft of a motor according to a third embodiment, showing by solid lines a state in which a clamp screw is not screwed into the shaft and showing by phantom lines a state in which the clamp screw is screwed into the shaft so that the shaft deforms.
Figure 8:
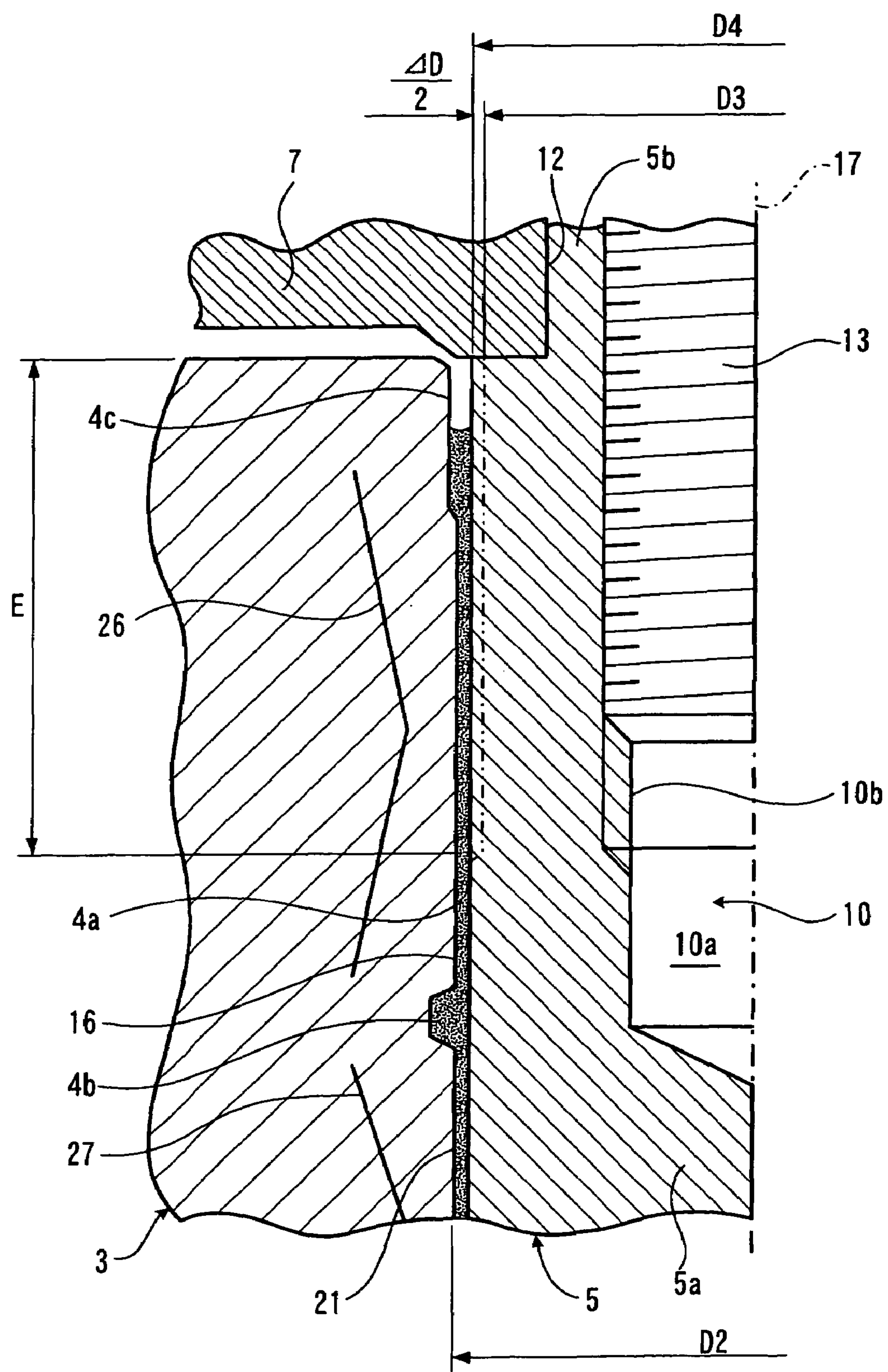
FIG. 8 is an enlarged sectional view of an upper portion of a gap between an inner peripheral surface of a sleeve and an outer peripheral surface of the shaft of the motor.

In the first and second embodiments, the inner diameter of the sleeve 3 in the predetermined range A is made large with allowance of deformation of the shaft 5, but in a third embodiment which will be described next, the outside diameter of the shaft 5 is made small with allowance of deformation of the shaft 5 as shown in FIGS. 7 and 8.

Namely, as shown in FIG. 7, outside diameters D3 and D4 of the body shaft part 5*a* of the shaft 5 have the following relationship. The outside diameter D3 of the body shaft part 5*a* in a predetermined range E from an upper end portion of the body shaft part 5*a* (namely, portion facing the opening upper end part 3*a* of the sleeve 3) is formed to be smaller by the expected deformation amount AD in the diameter direction of the shaft 5 as compared with the outside diameter D4 of the body shaft part 5*a* in a range F at the lower end side (the other end side) from the predetermined range E (namely, D3 =D4−ΔD).

When the length from the upper end portion of the body shaft part 5*a* of the shaft 5 to the tip end portion of the clamp screw 13 is set as L, and the wall thickness in the diameter direction from the outer peripheral surface of the body shaft part 5*a* to the screw hole 10 is set as t, the predetermined range E corresponds to the range of the length L to which the wall thickness t is added. The range F corresponds to the range from the lower end of the predetermined range E to the lower end of the body shaft part 5*a*.

The outside diameter D3 of the body shaft part 5*a* of the shaft 5 is constant and does not change in the predetermined range E. As a result, the body shaft part 5*a* is formed as a straight (upright) circular shaft. As an example, the body shaft part 5*a* of the shaft 5 is formed with the cylindricity of not more than 0.5 μm.

The body shaft insertion hole part 4*a* of the sleeve 3 is formed to have the diameter D2, and the outside diameter D4 of the body shaft part 5*a* of the shaft 5 has the value corresponding to the diameter D2 of the body shaft insertion hole part 4*a*.

Hereinafter, an operation in the above described construction will be described.

The outside diameter D3 of the body shaft part 5*a* of the shaft 5 in the predetermined range E is formed to be smaller by the expected deformation amount ΔD as compared with the outside diameter D4 in the range F. As a result, as shown by the solid line in FIG. 8, even if the shaft part 5*a* bulges outward in the diameter direction (outside diameter direction) and deforms, the first gap 21 in the predetermined range E can be prevented from being reduced in the diameter direction and being narrow because the outside diameter D3 extends substantially to the outside diameter D4. Thereby, it becomes possible to keep the first gap 21 in a suitable size. Therefore, the generated dynamic pressure of the radial bearing parts 26 and 27 does not become large, and the pressure in the vicinity of the gap 24 does not rise via the gaps 21, 22 and 23. As a result, the adverse effect of the shaft 5 excessively floating (excessive float) can be prevented.

An example of the expected deformation amount ΔD in the diameter direction of the shaft 5 in the third embodiment is the same as (1) to 4 which are described in the first embodiment.

Next, a fourth embodiment in the present invention will be described based on FIG. 9.

The outside diameter of the body shaft part 5*a* of the shaft 5 is formed as a tapered circular shaft which becomes smaller in diameter toward the upper end side (one end side) in the predetermined range E. In this case, the outside diameter of the body shaft part 5*a* becomes D3 at the upper end portion of the predetermined range E and becomes D4 at the lower end portion of the predetermined range E.

Figure 9:
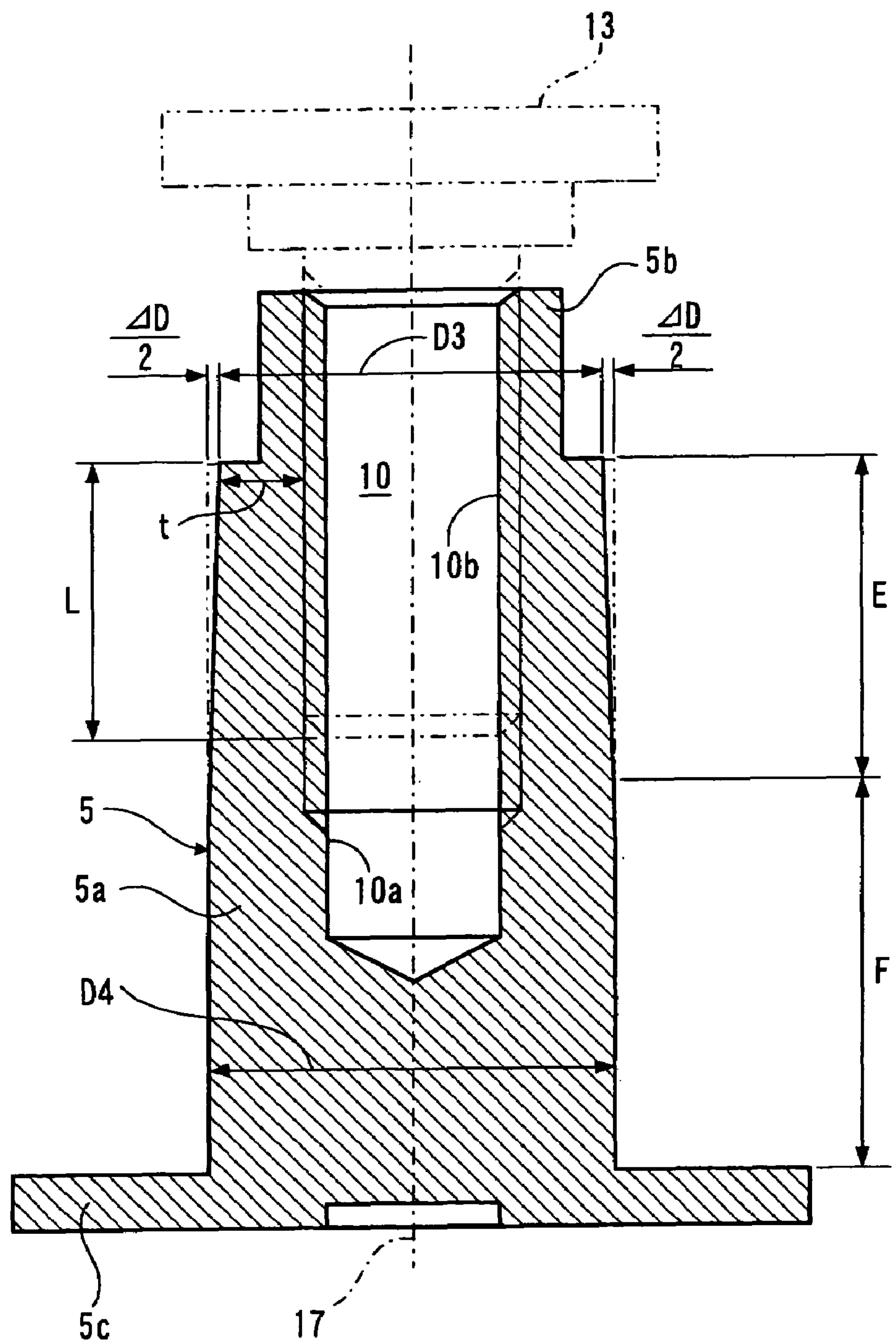
FIG. 9 is a sectional view of a shaft of a motor according to a fourth embodiment.
Figure 10:
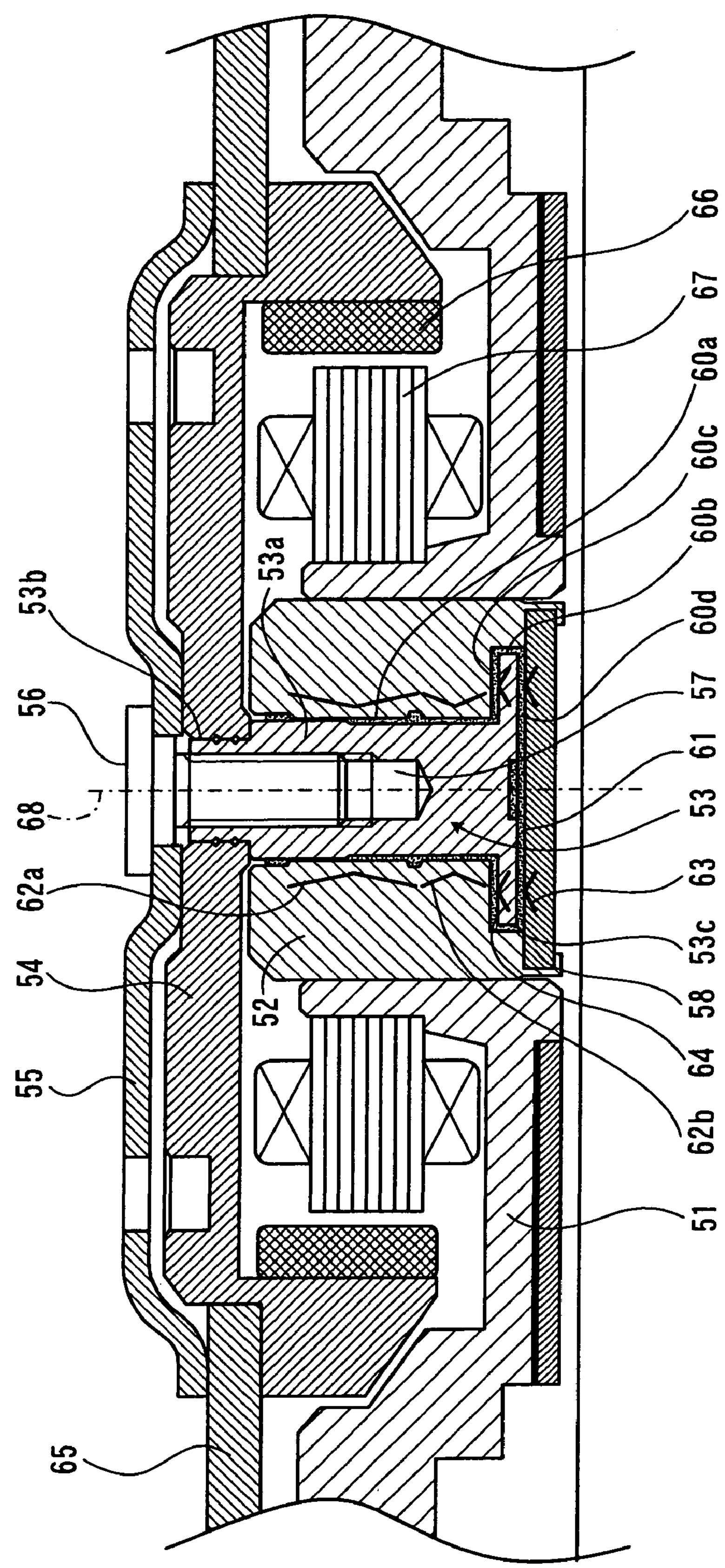
FIG. 10 is a sectional view of a motor including a conventional hydrodynamic bearing device.
Figure 11:
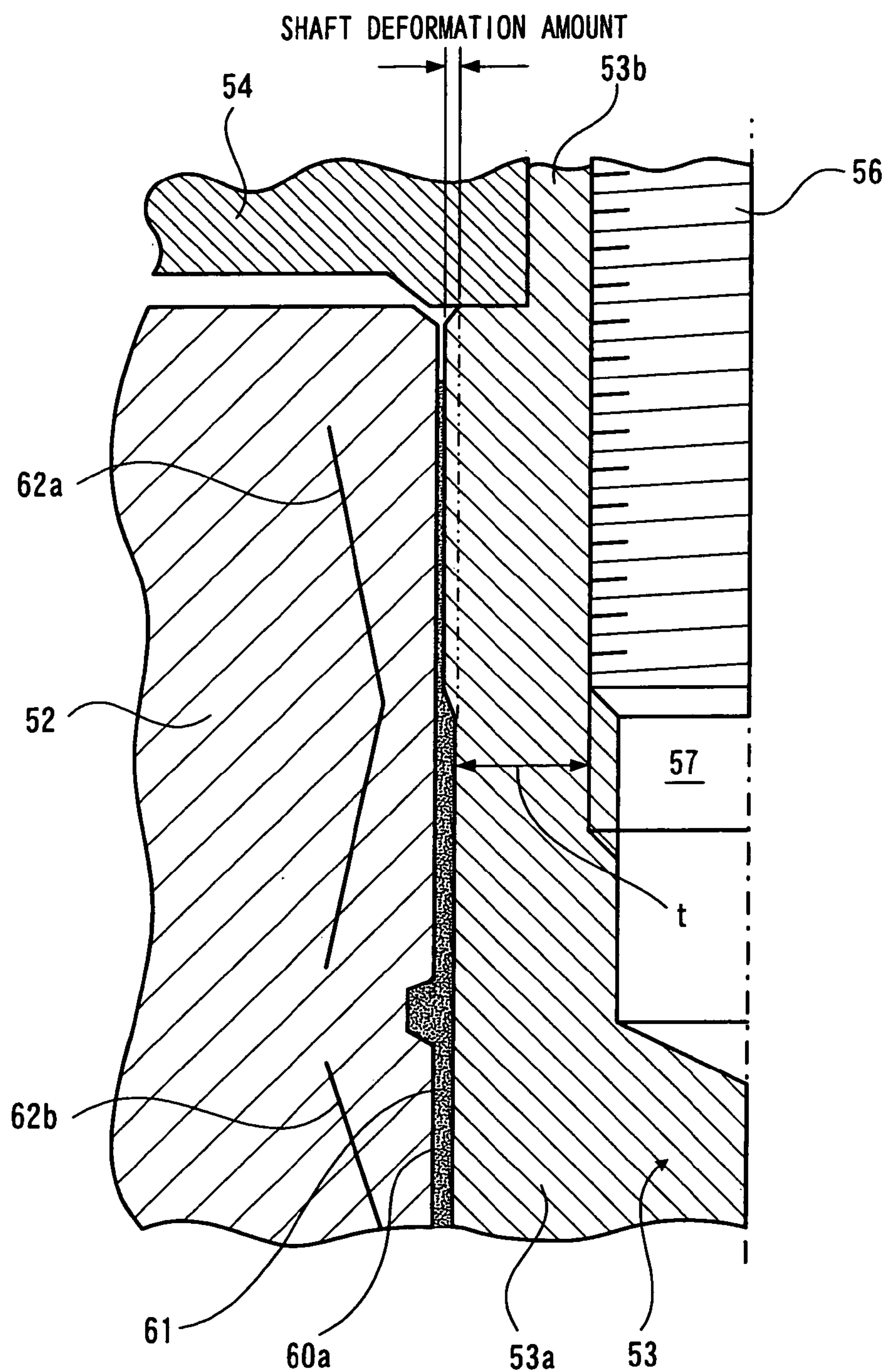
FIG. 11 is a enlarged sectional view of an upper portion of a gap between an inner peripheral surface of a sleeve and an outer peripheral surface of a shaft of the motor.
Figure 12:
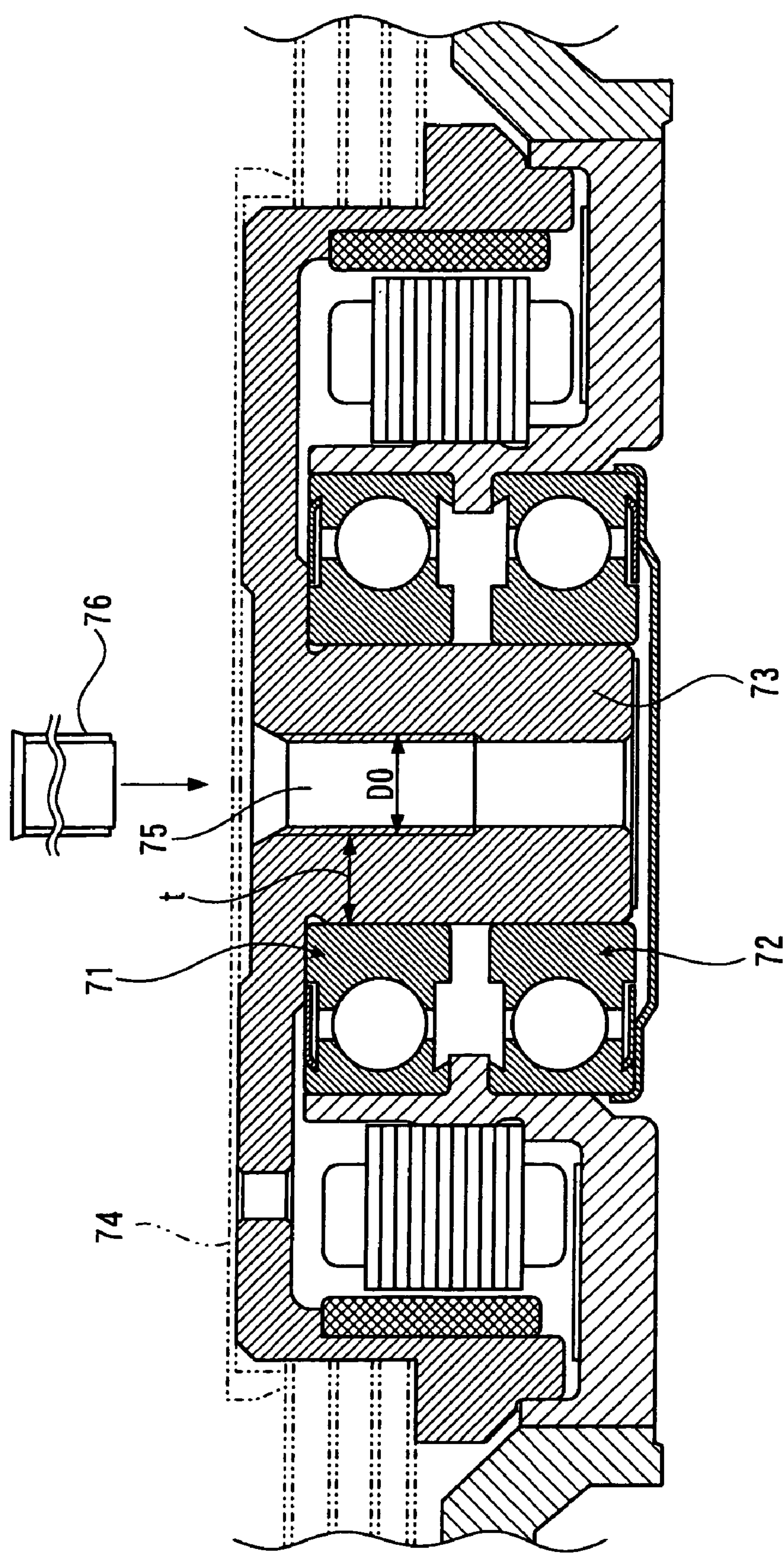
FIG. 12 is a sectional view of a motor including a conventional bearing device.

In the third embodiment and the fourth embodiment, as shown in FIGS. 7 and 9, the range which has the length L from the upper end portion of the body shaft part 5*a* of the shaft 5 to the tip end portion of the clamp screw 13 to which the wall thickness t in the diameter direction from the outer peripheral surface of the body shaft part 5*a* and the screw hole 10 is added is set as the predetermined range E (=L+t), but the range of the length L may be set as the predetermined range E (=L). The predetermined range A in the first and the second embodiments (see FIGS. 4 and 6) may be applied to the predetermined range E in the third and the fourth embodiments. Conversely, the predetermined range E in the third and the fourth embodiments (see FIGS. 7 and 9) may be applied to the predetermined range A in the first and the second embodiments.

In the first to fourth embodiments, the radial bearing parts 26 and 27 are formed on the inner peripheral surface of the sleeve 3 as shown in FIG. 2, but the radial bearing parts 26 and 27 may be formed on the outer peripheral surface of the shaft 5. The main thrust bearing part 28 is formed at the lower end surface of the thrust flange part Sc, but the main thrust bearing part 28 may be formed on the thrust plate 14. Further, the auxiliary thrust bearing part 29 is formed on the upper end surface of the thrust flange part 5*c*, but the auxiliary thrust bearing part 29 may be formed on the opposing lower surface of the sleeve 3 above the thrust flange part 5*c*.

In the above described first to fourth embodiments, the clamp 8 and the hub 7 which are the examples of the other members are fastened to the shaft 5 with the clamp screw 13, but only the clamp 8 may be fastened to the shaft 5 with the clamp screw 13.

In the first to fourth embodiments, two upper and lower radial bearing parts 26 and 27 are formed in the direction of the axis 17, but not less than three of them may be provided.

In the first to fourth embodiments, the operating oil 16 is used as an example of the operating fluid, but liquid or gas other than oil may be used.

In the first to fourth embodiments, the motor 1 of the structure in which the shaft 5 rotates with respect to the fixed sleeve 3 is cited, but the structure in which the sleeve 3 rotates with respect to the shaft 5 fixed to the base 2 may be adopted.

In the first to fourth embodiments, the tip end portion of the clamp screw 13 which is fastened into the screw hole 10 enters the formation range of the radial bearing part 26 at the upper end side, but the length of the clamp screw 13 may be shortened so that the tip end portion of the clamp screw 13 is located above the formation range of the radial bearing part 26 at the upper end side to prevent the clamp screw 13 from reaching the formation range of the radial bearing part 26 at the upper end side.

Besides, increasing the inside diameter (diameter D1 of the body shaft insertion hole part 4*a*) of the sleeve 3 in the predetermined range A (see FIG. 4) with deformation of the shaft 5 expected as described in the first embodiment and decreasing the outside diameter (outside diameter D3 of the body shaft part 5*a*) of the shaft 5 in the predetermined range E with deformation of the shaft 5 expected as described in the third embodiment (see FIG. 7) may be combined.

In the first to fourth embodiments, a so-called flanged shaft in which the thrust flange 5*c* is formed at the lower end portion of the body shaft part 5*a* is described as an example, but the present invention may also applied in a so-called flangeless shaft without the thrust flange 5*c*.

What is claimed is:

1. A hydrodynamic bearing device comprising a sleeve having a bearing hole formed therein, and a shaft inserted in the bearing hole, one of said sleeve and said shaft being fixed and the other being made to be rotatable, wherein said shaft has a screw hole for fastening another members to the shaft, the screw hole being formed to extend from one end portion of the shaft along a direction of an axis thereof to the other end side past an opening one end portion of the sleeve, an operating fluid is charged in a gap between an inner peripheral surface of the sleeve and an outer peripheral surface of the shaft, radial bearing parts having dynamic pressure generating grooves formed therein are provided on at least one of the inner peripheral surface of the sleeve and the outer peripheral surface of the shaft, and an inside diameter of the sleeve in a predetermined range including at least an area ranging from the opening one end part of the sleeve to a tip end portion of a screw that is screwed into the screw hole is formed to be larger by an expected deformation amount in a diameter direction of the shaft than an inside diameter of the sleeve in a range on the other end side from the predetermined range.

2. The hydrodynamic bearing device according to claim 1, wherein a plurality of radial bearing parts are provided in a direction of the axis of the shaft, the tip end portion of the screw that is screwed into the screw hole enters a formation range of the radial bearing part located at one end side, and the predetermined range corresponds to a range including an area from the opening one end part of the sleeve to the radial bearing part located at the one end side.

3. The hydrodynamic bearing device according to claim 1, wherein the bearing hole of the sleeve is formed to be straight in the predetermined range.

4. The hydrodynamic bearing device according to claim 1, wherein the bearing hole of the sleeve is formed to have cylindricity of not more than 0.5 μm in the predetermined range.

5. The hydrodynamic bearing device according to claim 1, wherein the bearing hole of the sleeve is formed in a taper shape so as to become larger in diameter toward the opening one end part in the predetermined range.

6. The hydrodynamic bearing device according to claim 1, wherein the shaft is rotatable with respect to the sleeve fixed to a base, a thrust plate opposed to the other end surface of the shaft is provided at the other end portion of the sleeve, the gap between the inner peripheral surface of the sleeve and the outer peripheral surface of the shaft and a gap between the other end surface of the shaft and the thrust plate communicate with each other, the operating fluid is charged in these gaps, and a thrust bearing part having a dynamic pressure generating groove formed therein is provided on at least one of the other end surface of the shaft and the thrust plate.

7. A compact motor comprising the hydrodynamic bearing device according to claim 1.

8. A hydrodynamic bearing device comprising a sleeve having a bearing hole formed therein, and a shaft inserted in the bearing hole, one of said sleeve and said shaft being fixed and the other being made to be rotatable, wherein said shaft has a screw hole for fastening another members to the shaft, the screw hole being formed to extend from one end portion of the shaft along a direction of an axis thereof to the other end side past an opening one end portion of the sleeve, an operating fluid is charged in a gap between an inner peripheral surface of the sleeve and an outer peripheral surface of the shaft, radial bearing parts having dynamic pressure generating grooves formed therein are provided on at least one of the inner peripheral surface of the sleeve and the outer peripheral surface of the shaft, and an outside diameter of the shaft in a predetermined range including at least an area from a portion facing the opening one end part of the sleeve to a tip end portion of a screw that is screwed into the screw hole is formed to be smaller by an expected deformation amount in a diameter direction of the shaft than an outside diameter of the shaft in a range on the other end side from the predetermined range.

9. The hydrodynamic bearing device according to claim 8, wherein the predetermined range corresponds to a range of a length from a portion facing the opening one end part of the sleeve to the tip end portion of the screw that is screwed into the screw hole with addition of a wall thickness in the diameter direction of the shaft of the portion formed with the screw hole.

10. The hydrodynamic bearing device according to claim 8, wherein the shaft is formed to be straight in the predetermined range.

11. The hydrodynamic bearing device according to claim 8, wherein the shaft is formed to have cylindricity of not more than 0.5 μm in the predetermined range.

12. The hydrodynamic bearing device according to claim 8, wherein the shaft is formed in a taper shape so as to become smaller in diameter toward the one end side in the predetermined range.

13. The hydrodynamic bearing device according to claim 7, wherein the shaft is rotatable with respect to the sleeve fixed to a base, a thrust plate opposed to the other end surface of the shaft is provided at the other end portion of the sleeve, the gap between the inner peripheral surface of the sleeve and the outer peripheral surface of the shaft and a gap between the other end surface of the shaft and the thrust plate communicate with each other, the operating fluid is charged in these gaps, and a thrust bearing part having a dynamic pressure generating groove formed therein is provided on at least one of the other end surface of the shaft and the thrust plate.

14. A compact motor comprising the hydrodynamic bearing device according to claim 7.

* * * * *